(12) United States Patent
Anzai et al.

(10) Patent No.: US 7,309,258 B2
(45) Date of Patent: Dec. 18, 2007

(54) MEMORY CARD SOCKET STRUCTURE

(75) Inventors: Tsunehiro Anzai, Watarai (JP);
Hirohisa Tanaka, Tsu (JP); Toshiya Kimura, Tsu (JP)

(73) Assignee: Matsushita Electric Works, Ltd., Osaka (JP)

( * ) Notice: Subject to any disclaimer, the term of this patent is extended or adjusted under 35 U.S.C. 154(b) by 0 days.

(21) Appl. No.: 11/519,025

(22) Filed: Sep. 12, 2006

(65) Prior Publication Data

US 2007/0059983 A1    Mar. 15, 2007

(30) Foreign Application Priority Data

Sep. 14, 2005   (JP) ............................ 2005-267451

(51) Int. Cl.
*H01R 24/00* (2006.01)
(52) U.S. Cl. ...................................... 439/630; 439/159
(58) Field of Classification Search ................ 439/630, 439/159, 160
See application file for complete search history.

(56) References Cited

U.S. PATENT DOCUMENTS 6,520,783 B2 *   2/2003   Hsu ........................... 439/157

6,540,557 B1     4/2003   Yu

FOREIGN PATENT DOCUMENTS

| EP | 1 156 448 | 11/2001 |
|----|-----------|---------|
| EP | 1 160 931 | 12/2001 |
| EP | 1 193 638 | 4/2002 |
| EP | 1 227 428 | 7/2002 |
| WO | 02/073524 | 9/2002 |

* cited by examiner

*Primary Examiner*—Ross Gushi
(74) *Attorney, Agent, or Firm*—Bacon & Thomas, PLLC (57) ABSTRACT

A memory card socket structure includes a base shell and a cover shell adapted to face a top and a bottom surface of a memory card, a contact block disposed in a rear side of a card compartment formed by the base shell and the cover shell, and a plurality of contact terminals fixed at the contact block and extended from the contact block toward an opening side of the card compartment to be in contact with terminals of the memory card. The plurality of contact terminals have at least one shorter terminal and at least one longer terminal, the support position at which said at least one longer terminal is supported by the base shell being closer to the opening side of the card compartment than the support position at which said at least one shorter terminal is supported by the contact block.

6 Claims, 8 Drawing Sheets

MEMORY CARD SOCKET STRUCTURE

FIELD OF THE INVENTION

The present invention relates to a memory card socket structure.

BACKGROUND OF THE INVENTION

Recently, various electronic devices such as a digital camera and a mobile phone have been increasingly equipped with a memory card socket structure for allowing a small-sized storage medium (hereinafter, simply referred to as 'memory card') such as a Mini SD Memory Card (Registered Trademark) to be inserted thereinto or taken out therefrom.

Such a memory card socket structure typically has a plurality of contact terminals (contacts) making a contact with terminals (I/O contact surfaces) of a memory card corresponding thereto when the memory card is inserted in a card accommodating portion of a memory card case installed at an electronic device, wherein transception of data and signals is carried out between the memory card and the electronic device via the contact terminals (see, for example, Japanese Patent Laid-open Application No. 2004-119148, specifically Pg. 4 and FIG. 18: Reference 1).

In Reference 1, the number of the contact terminals is determined depending on the number of the terminals (electrodes) of the memory card. A proximal end of each contact terminal is fixed at a contact block arranged at a rear side of the card accommodating portion, while its distal end is projected toward a front side of the card accommodating portion to make a contact with a corresponding one of the terminals of the memory card.

Further, the contact terminals include shorter terminals and longer terminals so as to be corresponded to set positions of the terminals (electrodes) of the memory card.

In the configuration of the above conventional memory card socket structure, however, if the degrees of bending of the shorter terminals and longer terminals are set identical, contact surface pressures between the longer terminals and the corresponding memory card terminals can be lowered relative to contact surface pressures between the shorter terminals and the corresponding the memory card terminals. In addition, since the longer terminals are more likely to be affected by a dimensional difference or the like, there is a high likelihood that the longer terminals would suffer a bending deformation or a buckling deformation caused by a thermal stress or a force exerted thereto when inserting the memory card into the socket structure. Such a deformation would in turn cause a reduction in the contact surface pressures between the longer terminals and the memory card terminals, resulting in a contact failure therebetween.

Moreover, in case of the memory card case being formed of a metal conductor, distal ends of the bent longer terminals might come into contact with the case, thus being subject to a short circuit.

SUMMARY OF THE INVENTION

It is, therefore, an object of the present invention to provide a memory card socket structure capable of providing a sufficient contact surface pressure between memory card terminals and longer contact terminals thereof and also of suppressing deformation of the longer contact terminals.

In accordance with a preferred embodiment of the present invention, there is provided a memory card socket structure including: a base shell and a cover shell adapted to face a top and a bottom surface of a memory card; a contact block disposed in a rear side of a card compartment formed by the base shell and the cover shell; and a plurality of contact terminals fixed at the contact block and extended from the contact block toward an opening side of the card compartment to be in contact with terminals of the memory card, wherein the plurality of contact terminals include at least one shorter terminal and at least one longer terminal, the support position at which said at least one longer terminal is supported by the base shell being closer to the opening side of the card compartment than the support position at which said at least one shorter terminal is supported by the contact block.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
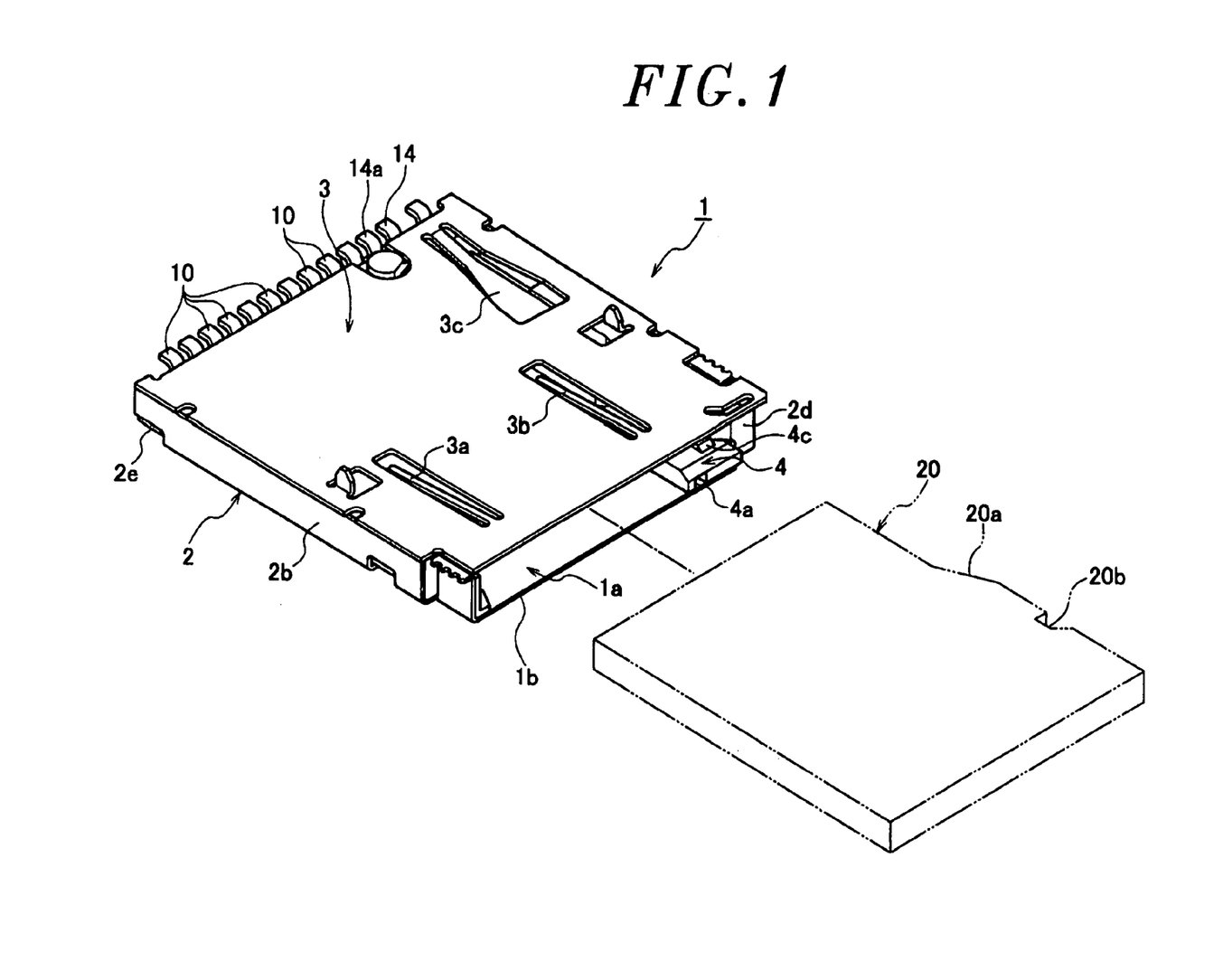
FIG. 1 is a perspective view of a memory card socket structure in accordance with a preferred embodiment of the present invention prior to a memory card being inserted therein.
Figure 2:
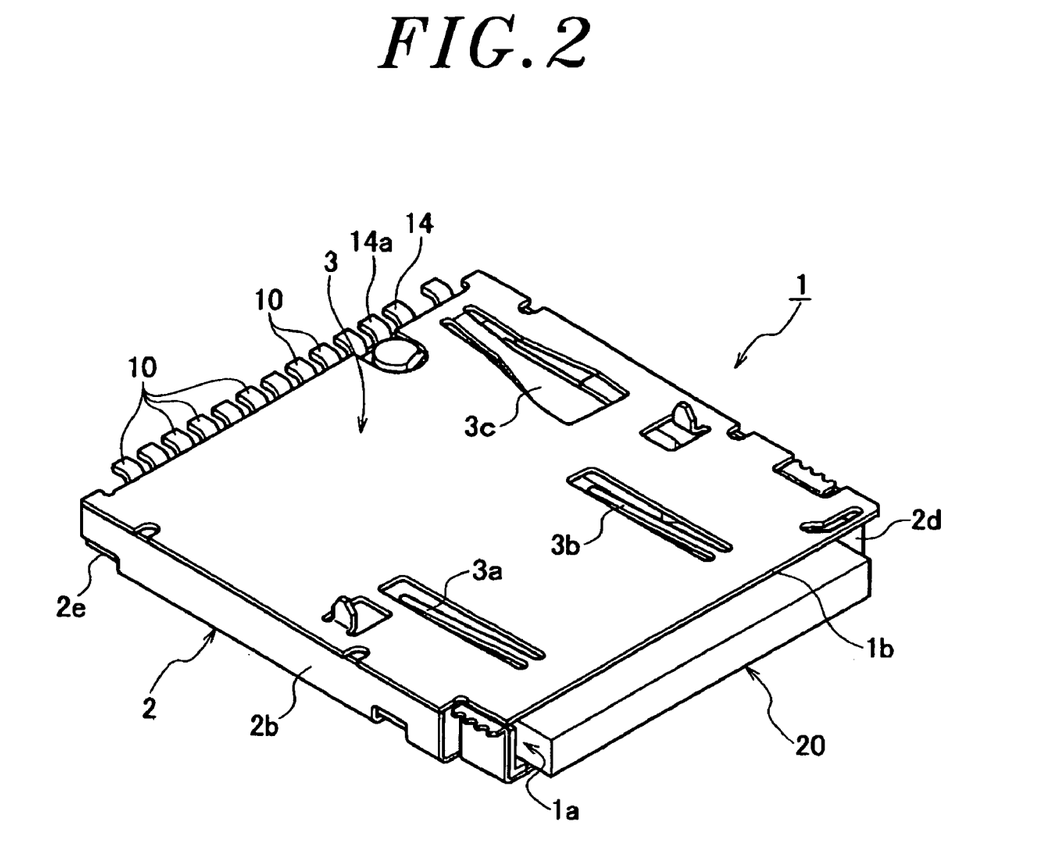
FIG. 2 sets forth a perspective view showing a state where the memory card is inserted in the memory card socket structure.
Figure 3:
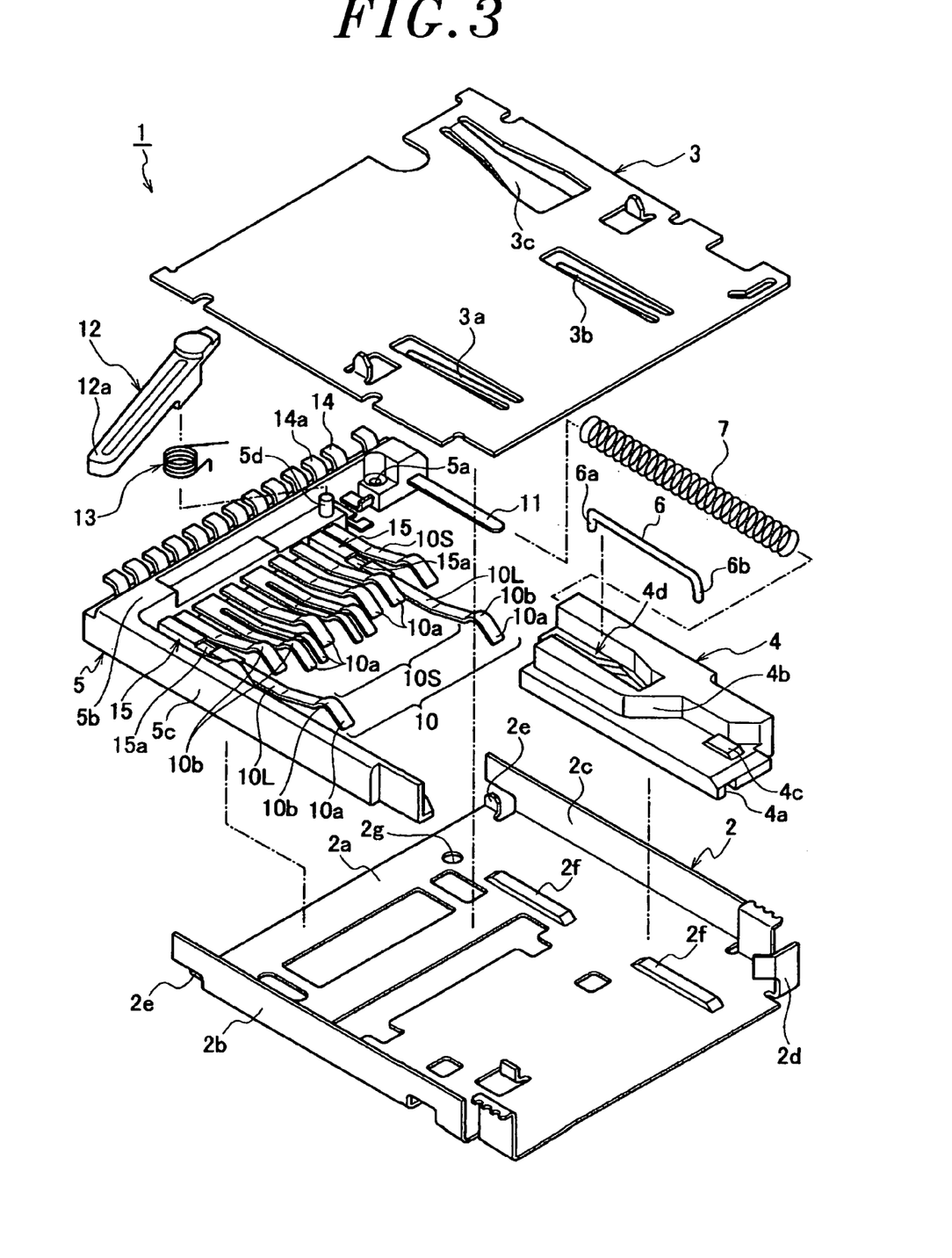
FIG. 3 presents an exploded perspective view of the memory card socket structure.

Hereinafter, preferred embodiments of the present invention will be descried in detail with reference to the accompanying drawings. FIGS. 1 to 8 are views setting forth a memory card socket structure in accordance with a first preferred embodiment of the prevent invention. FIG. 1 sets forth a perspective view of the memory card socket structure prior to a memory card being inserted therein; FIG. 2 is a perspective view showing a state where the memory card is inserted in the memory card socket structure; and FIG. 3 presents an exploded perspective view of the memory card socket structure.

Figure 4:
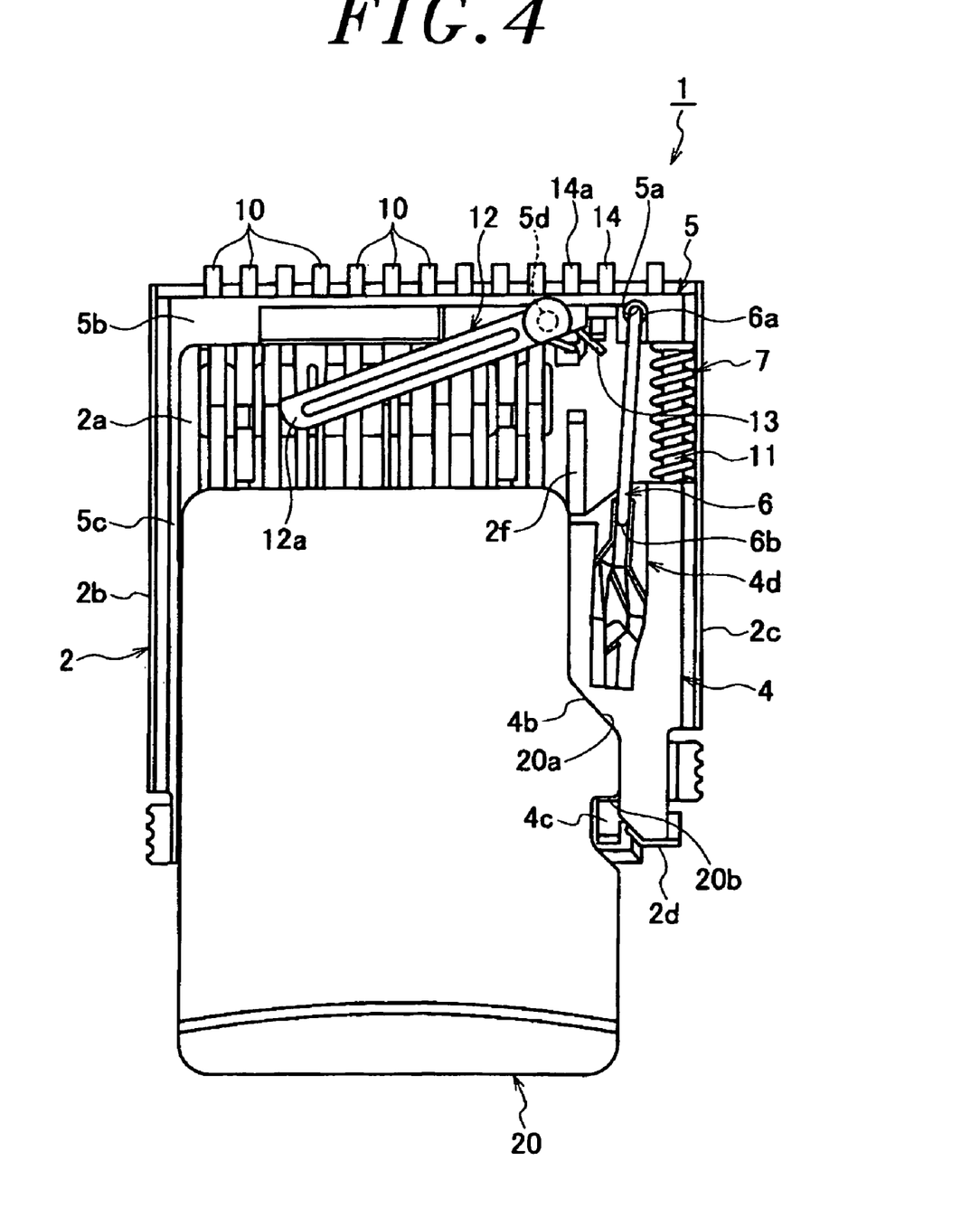
FIG. 4 provides a top view of the memory card socket structure, from which a cover is detached, showing a state prior to the memory card is mounted in the socket structure.
Figure 5:
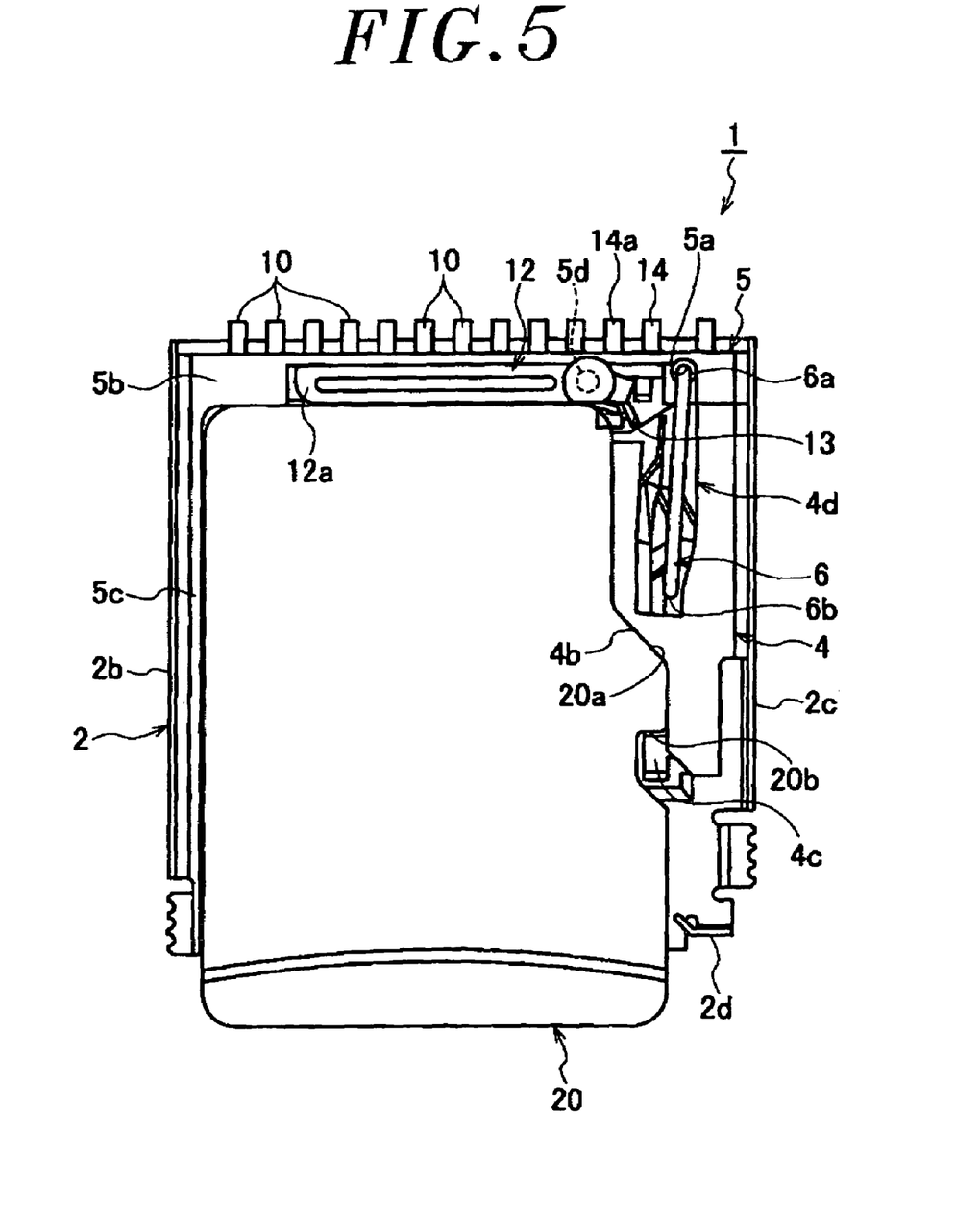
FIG. 5 depicts a top view of the memory card socket structure, from which the cover is detached, showing a state where the memory card is mounted in the socket structure.
Figure 6:
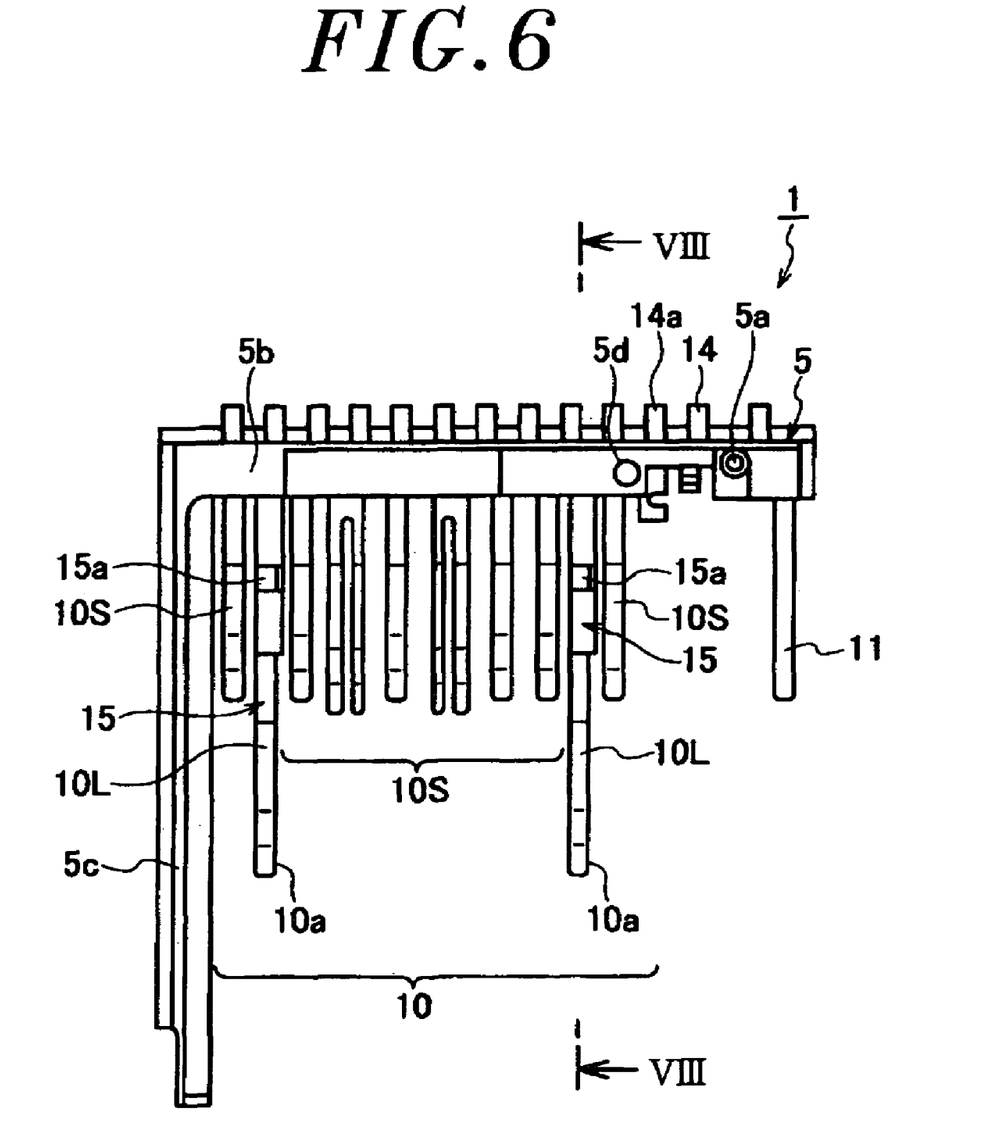
FIG. 6 offers a top view of a plurality of contact terminals fixed at a contact block in accordance with the preferred embodiment of the present invention.
Figure 7:
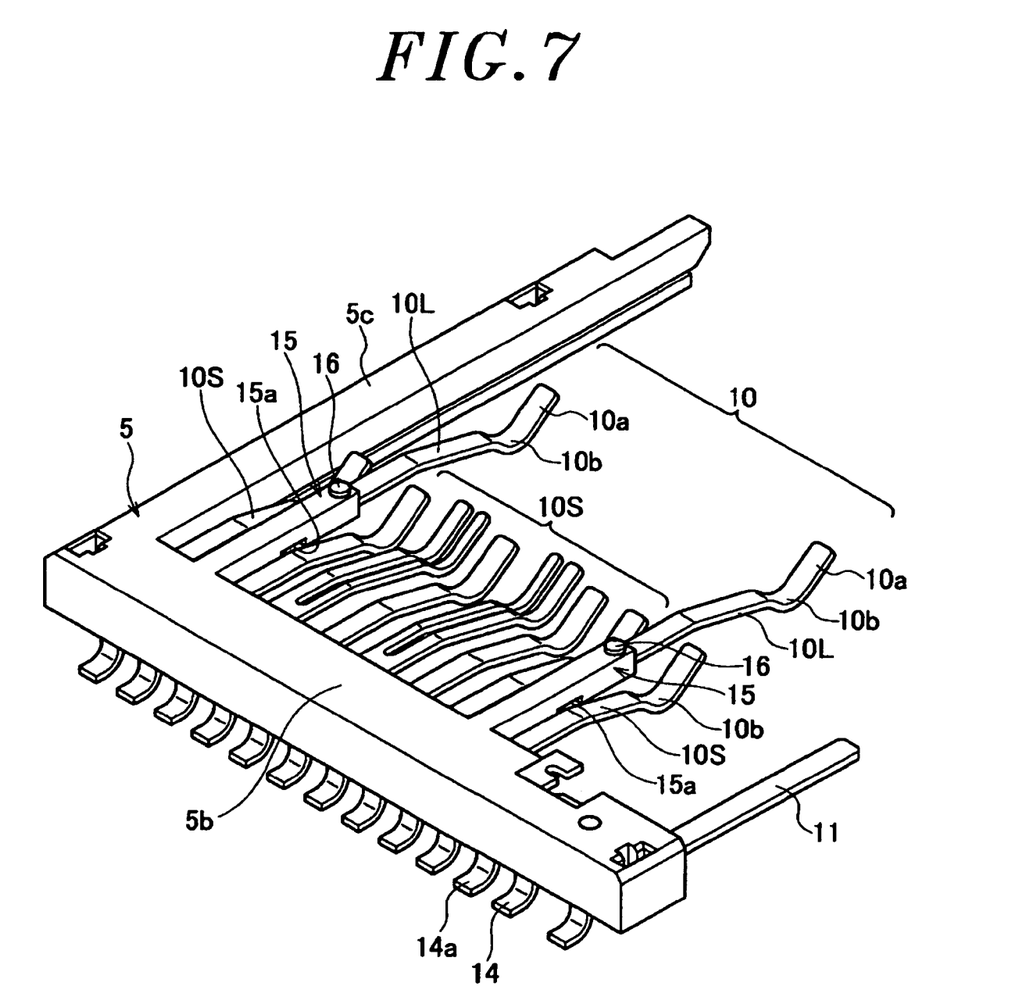
FIG. 7 shows a perspective bottom view of the plurality of contact terminals fixed at the contact block.
Figure 8:
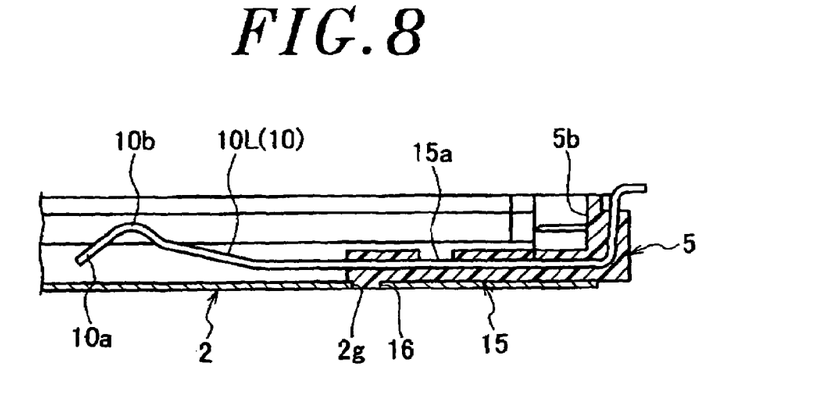
FIG. 8 is a cross sectional view of the memory card socket structure in accordance with the preferred embodiment of the present invention, taken along a line VIII-VIII of FIG. 6.

FIGS. 4 and 5 provide top views of the memory card socket structure, illustrating an insertion of the memory card thereinto without a cover shell installed; FIG. 6 offers a top view of a plurality of contact terminals fixed at a contact block in accordance with the preferred embodiment of the present invention; FIG. 7 shows a perspective bottom view of the plurality of contact terminals fixed at the contact block; and FIG. 8 is a cross sectional view of the memory card socket structure, taken along a line VIII-VIII of FIG. 6.

A memory card socket structure 1 in accordance with a first preferred embodiment of the present invention is disposed at an electronic device (not shown) or the like to serve as a socket for allowing a memory card 20 to be inserted thereinto or taken out therefrom. When the memory card 20 is inserted into the memory card socket structure 1, terminals (electrodes, not shown) formed and exposed at a top or a bottom surface of the memory card 20 is brought into contact with contact terminals 10 provided in the memory card socket structure 1 to be electrically connected therewith, thus making it possible to transceive data between the electronic device or the like and the memory card 20.

Further, the memory card socket structure 1 is configured to have a so-called push-on and push-off mechanism, in which the memory card 20 can be locked in a preset mounting state by being inserted and pushed into a card compartment 1a of the memory card socket structure 1 through an opening (entrance) 1b thereof, and can be unlocked from the locked state and rejected from the opening 1b of the card compartment 1a by being pushed thereafter.

In general, the memory card socket structure 1 includes a case in a rectangular shelled shape with a substantially plan surfaces and the thin elongated strip-shaped opening 1b at its one side (front side); a slider 4 supported in the card compartment 1a of the case so as to be moved back and forth between the opening 1b side and the rear side of the card compartment 1a; a coil spring 7 serving as a biasing member for forcing the slider 4 toward the opening 1b side in the card compartment 1a; a contact block 5 disposed at the rear portion of the card compartment 1a; and a plurality of stationary contact terminals 10 fixed at the contact block 5.

Specifically, in the memory card socket structure 1, the card compartment 1a, which is adapted to allow the memory card 20 to be inserted thereinto or taken out therefrom, is formed by a base shell 2 and a cover shell 3 formed of a metal plate such as stainless steel having an electric conductivity and disposed to face a top and a bottom surface of the memory card 20. In this preferred embodiment, by forming the base shell 2 and the cover shell 3 with the metal material, the case can be made to have desired rigidity and strength. At the same time, they can be used as grounds (earths) by forming the two components with the conductive material.

The base shell 2 includes a substantially rectangular base 2a and two sidewalls 2b, 2c having a certain height formed by bending a pair of widthwise ends of the base 2a approximately in perpendicular manners. That is, the base shell 2 is in a U shape with a cross section of evenly leveled walls for overall.

Further, a stopper 2d is formed at an opening 1b side of one (e.g., 2c in FIG. 3) of the sidewalls 2b and 2C by raising a corner portion of the base 2a. With the stopper 2d, the slider 4 is prevented from being released out of the opening 1b. Further, the base 2a has hook portions 2e on which the contact block 5 is hooked to be fastened at its installation position; and projection bars 2f elongated in a reciprocating direction of the memory card 20.

Referring to FIG. 3, the cover shell 3 is obtained by a metal plate made of stainless steel or the like into by forming it into an approximately rectangular plate shape identical to the shape of the base 2a of the base shell 2. Provided on the cover shell 3 is spring members 3a and 3b for pressing the memory card 20, and a spring element 3c for pressing a pin 6 to be described later is also provided.

The base shell 2 and the cover shell 3 are welded by, e.g., laser welding such that the cover shell 3 is mounted on the raised ends of the sidewalls 2b and 2c, thereby defining the card compartment 1a.

Further, by engaging projection bars 2f provided on the base shell 2 with recesses 4a formed at the slider 4, the slider 4 is guided to move back and forth along the sidewall 2c of the base shell 2. The slider 4 has an engaging portion 4b to be fitted with a corresponding stepped portion 20a (see FIG. 4) and a protrusion 4c to be engaged with a cutoff portion 20b (see FIG. 4). The stepped portion 20a and the cutoff portion 20b are provided on a peripheral surface of one side of the memory card 20 such that the cutoff portion 20b is located apart from the stepped portion 20a in a direction opposite to the memory card inserting direction.

If the memory card 20 is inserted into the card department 1a through the opening 1b, the stepped portion 20a of the memory card 20 will come into contact with the recess 4b, and the cutoff portion 20b is engaged with the protrusion 4c. Therefore, the memory card 20 is allowed to be moved back and forth in the card compartment 1a while being maintained on the slider 4.

Positioning of the slider 4 in the card compartment 1a is controlled by the pin 6, whose first end 6a is rotatably fitted into an insertion hole 5a of the contact block 5; a groove portion 4d for guiding a second end 6b of the pin 6 along a preset path; and the coil spring 7, interposed between the slider 4 and the contact block 5, for biasing the slider 4 toward the opening 1b.

In particular, with predetermined steps on the bottom surface of the groove portion 4d, the second end 6b of the pin 6 is guided into a desired passage of the groove portion 4d without being retrograded at least within a specific range. In other words, the second end 6b is guided into the desired passage in the groove portion 4d by forcing, with a biasing force of the coil spring 7 and a force exerted from inserting the memory card 20, the second end 6b to be in contact with side walls of the groove portion 4d and with the bottom surface of the groove portion 4d by mean of the spring element 3c provided at the cover shell 3.

Further, a part of the groove portion 4d closed to the opening 1b side is in a substantially heart shape when viewed from the top, forming a so-called heart cam mechanism. The above-mentioned push-on and push-off functions of the memory card 20 is, therefore, realized.

The contact block 5 has an inner wall 5b and a sidewall 5c made of an insulating resin, wherein the inner wall 5b and the sidewall 5c jointly form an L shape when viewed from the top. The contact block 5 is fixed on the base shell 2 via the hook portions 2e such that its inner wall 5b is disposed at the rear side of the card compartment 1a, while its sidewall 5c is disposed at the sidewall 2b (see FIG. 3) of the card compartment 1a.

The inner wall 5b has a plurality of bar-shaped contact terminals 10 penetrating it, wherein the contact terminals 10 are formed of a conductive metal, and leading ends 10a of the contact terminals 10 are projected through inside the card compartment 1a from the inner wall 5b, facing toward the opening 1b.

The memory card 20 is inserted between the contact terminals 10 and the cover shell 3. Each leading end 10a of the contact terminals 10 is provided with a curved portion 10b smoothly protruded toward the cover shell 3. When the memory card 20 is inserted in a preset mounted position near the rear side of the card compartment 1a, the curved portions 10b come into contact with a surface of the memory card, the surface facing the base shell 2 (i.e., the bottom surface of the memory card 20 in the drawings).

Further, a guide pin 11 is fixed at the inner wall 5b, and it is configured to be inserted through the coil spring 7. With the guide pin 11, buckling of the coil spring 7 is prevented.

Further, as illustrated in FIG. 3, a movable arm 12 is rotatably supported at a columnar protrusion 6f protruded from the inner wall 5b of the contact block 5. Specifically, a leading end portion 12a of the movable arm 12 is pivotally biased toward the opening 1b side by a torsion spring 13 wounded around the protrusion 5d, while it is pivotally pressed toward the rear side of the card compartment 1a through a leading end portion of the memory card 20 which is inserted into the card compartment 1a.

Accordingly, when the memory card 20 is yet to be inserted all the way to its mounted position near the rear side of the card compartment 1a and is in a non-contact position with the movable arm 12, the leading end portion 12a of the movable arm 12 is fully rotated toward the opening 1b (below, simply referred to as "maximum opening 1b-side position), as shown in FIG. 4. Further, as shown in FIG. 5, when the memory card 20 is inserted all the way to its mounted position, the leading end portion 12a of the movable arm 12 is rotated toward the rear side, thereby being located at a rear position of the card compartment 1a.

That is, depending on the insertion and the extraction of the memory card 20, the movable arm 12 is rotated between the maximum opening 1b-side position shown in FIG. 4 and the rear position shown in FIG. 5. When the movable arm 12 is located at the maximum opening 1b-side position, two stationary contacts 14 and 14a fixed at the contact block 5 are made to be short-circuited electrically, while being electrically separated from each other when the movable arm 12 is disposed at its rear position.

Accordingly, by detecting a conducting or a non-conducting state between the stationary contacts 14 and 14a, it is possible to sense whether or not the memory card 20 is present at the preset mounted position in the card compartment 1a.

Further, since the sidewall 5c is extended from the rear side of the card compartment 1a to the opening 1b along one of lateral edges of the card compartment 1a, it is possible to refrain the contact block 5 from falling down or being rotated as well as to improve the support rigidity of the case. Here, it is preferable to configure the sidewall 5c to be in contact with both of the base shell 2 and the cover shell 3.

In this preferred embodiment, the plurality of contact terminals 10 include shorter terminals 10S and longer terminals 10L configured to correspond to terminal positions of the memory card 20, as shown in FIG. 6.

Referring to FIGS. 7 and 8, each of the longer terminals 10L is provided with supports 15 for supporting the leading end 10a thereof against the base shell 2.

The supports 15 are formed of insulating resins integrated as a whole with longer terminal 10L's sides at least facing the base shell 2 (see FIG. 8), the insulating resin serving as an insulating member. By interposing the insulating resins between the longer terminal 10L and the base shell 2 (specifically, the base 2a), the respective longer terminals 10L and the base shell 2 are separated from each other by a preset distance.

That is, in this preferred embodiment, the contact terminals 10 are insert-molded when molding the contact block 4 with an insulating resin, during which the supports 15 are also insert-molded with the same insulating resin.

Each support 15 is extended from the contact block 5 as a whole therewith up to a substantially middle portion of the corresponding longer terminal 10L in its lengthwise direction, while wrapping the outer periphery of the corresponding longer terminal in the insulating resin. In particular, the thickness of the insulating resin's portion proximal to and facing the base shell 2 is set to be larger than those of the other portions. Thus, the preset distance between the base 2a and the longer terminal 10L can be implemented by such a thickness.

Here, as shown in FIGS. 3 and 8, each of the supports 15 has an exposed portion 15a with no insulating resin cast thereon, the exposed portion 15a being provided on a side of the longer terminal 10L, the side facing the cover shell 3 (upper side in FIG. 3).

By providing the exposed portion 15a at the insulating resin, when the molten insulating resin hardens after the support 15 is insert-molded with the insulating resin, the thermal contraction rate of the support 15's portion facing the base shell 2 (lower portion in FIG. 8) can be set to be greater. Thus, the longer terminal 10L can be prevented from being turned over toward the side of the cover shell 3 (upper side in FIG. 8), and it is also possible to prevent the resilient force of the longer terminal 10L from being excessively exerted to the memory card 20 during the insertion/extraction of the memory card 20.

Further, in this preferred embodiment, protrusions 16 are independently formed at the supports 15 to confine a movement of the longer terminal 10L relative to the base shell 2, as shown in FIGS. 7 and 8.

Each of the protrusions 16 is protrudingly formed at the end portion of the corresponding support 15's surface facing the base shell 2 (lower side in FIG. 8) as a whole with the support 15, wherein the protrusion 16 has a short columnar shape. Each of the protrusion 16 is fitted into its corresponding hole 2g provided in the base 2a of the base shell 2. That is, in this preferred embodiment, the protrusion 16 and the hole 2g together forms a movement confining mechanism.

In the configuration of the memory card socket structure in accordance with the first preferred embodiment described above, among the shorter terminals 10S and the longer terminals 10L of the contact terminals 10, each of longer terminal 10L is supported at the base shell 2 via the support member 15, wherein the position of the support member 15 is located away from the support position of the longer terminal 10L corresponding to that of the shorter terminal 10S, which is supported at the inner wall 5b, toward the leading end 10a thereof. Accordingly, the spring constant of the leading ends 10a of the longer terminals 10L coming into contact with the terminals of the memory card 20 is increased, whereby the deformation of the longer terminals 10L can be suppressed, which, in turn, prevents a reduction in the contact surface pressures between the longer terminals 10L and the terminals of the memory card 20 and even further prevents a contact failure therebetween, for example.

Further, even when the contact terminals 10 including the shorter ones 10S and the longer ones 10L are bent and deformed due to a thermal stress, the bending deformation of the longer terminals 10L can be minimized because the leading ends 10a of the longer terminals 10L are supported by the supports 15. As a result, it is also possible to prevent the leading ends 10a from contacting the base-shell 2 of the memory card socket structure 1. Further, the longer terminals 10L can be prevented from being short-circuited with the base shell 2 formed of a conductive metal.

Here, if the distances from the fixation locations of the terminals 10S and 10L to the leading ends thereof are set to be substantially identical, contact surface pressures between the terminals of the memory card 20 and the longer and the shorter terminals 10L and 10S can be set substantially same. Thus, the problem of only a certain terminal being worn away or the like can be prevented.

In addition, by forming the supports 15 with the insulating resin as a whole with at least the longer terminals 10L's base shell 2-facing sides and thus interposing the insulating resin between the longer terminals 10L and the base shell 2, the longer terminals 10L and the base shell 2 (base 2a) are separated from each other while maintaining a certain distance therebetween. Therefore, the high positional accuracy of the longer terminals 10L can be secured, and the longer terminals 10L and the base shell 2 can be kept insulated from each other electrically.

Moreover, since the longer terminals 10L are supported by the support members 15 which is formed as a whole with the contact block 5 in a manner as to protrude toward the front portion of the card compartment 1a along the base 2a of the base shell 2, the number of required components can be reduced in comparison with a case of forming separate support members for the longer terminals 10L. As a result, efforts and costs for the manufacture of the socket structure can be reduced.

Besides, with the protruded portions extended from the contact block 5, i.e., the supports 15, the deformation of the longer terminals 10L is suppressed more securely. Further, it can prevent the contact block 5 from falling down or being rotated, and improve the rigidity of the case of the socket structure as well.

Also, by providing the protrusions 16 at the supports 15 and fitting the protrusions 16 into the holes 2g of the base shell 2, the relative movement of the longer terminals 10L with regard to the base shell 2 can be confined. More concretely, the deformation of the longer terminals 10L in a direction in which the longer terminals 10L becomes more distant from the base shell 2 can be suppressed. Thus, when the memory card 20 is inserted into the card compartment 1a, the longer terminals 10L are prevented from being raised and obstructing complete insertion of the memory card 20. Also, it can prevent abrasion or deformation of the longer terminals 10L or the terminals of the inserted memory card 20 which may be generated by an excessively great contact surface pressure therebetween. That is, the positioning precision of the contact points of the longer terminals 10L and the memory card terminals is improved, resulting in preventing a contact failure therebetween.

Figure 9:
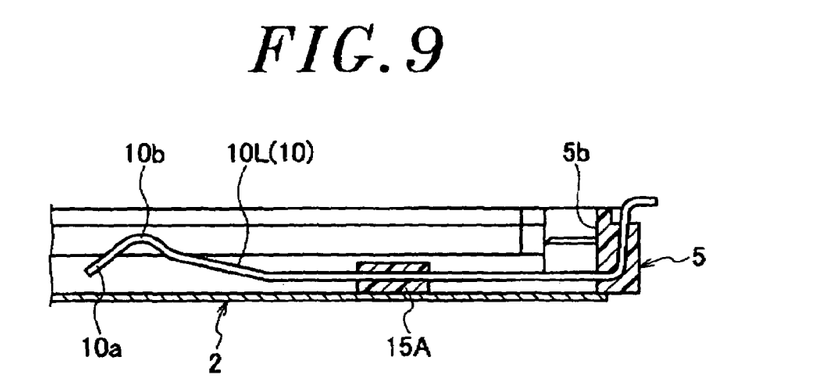
FIG. 9 presents a cross sectional view of a memory card socket structure in accordance with a modification of FIG. 8.
Figure 10:
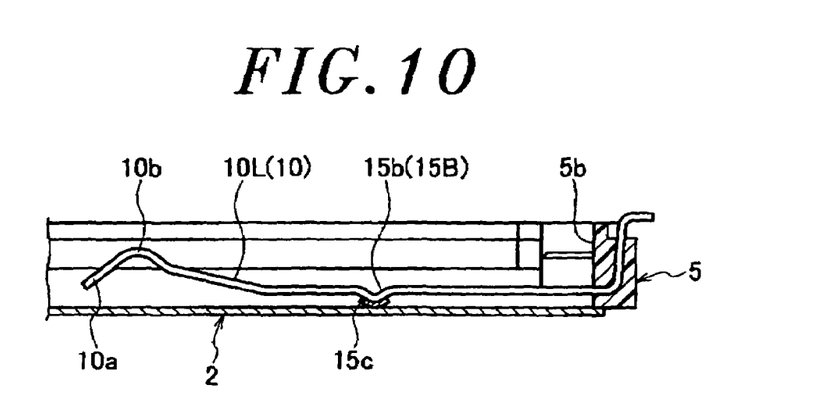
FIG. 10 sets forth a cross sectional view of a memory card socket structure in accordance with another modification of FIG. 8.

FIGS. 9 and 10 illustrate a second and a third preferred embodiment of the present invention, in which parts identical to those described in the first one will be assigned same reference numerals, and description thereof will be omitted. FIGS. 9 and 10 show cross sectional views of a support.

Unlike the first preferred embodiment shown in FIG. 8 where the support 15 is formed by extending the insulating resin protrudingly from the contact block 5 up to the substantially middle portion of a longer terminal 10L in its lengthwise direction, a support 15A in accordance with the second preferred embodiment shown in FIG. 9 is formed only at a substantially middle portion of the longer terminal 10L in its lengthwise direction without being extended from the contact block 5. The support 15A is provided at the side of the longer terminal 10L, the side being proximal to and facing the base shell 2 (lower side in FIG. 9).

In the third preferred embodiment shown in FIG. 10, a substantially V-shaped caved portion 15b protruding toward the base shell 2 is formed at a substantially middle portion of a longer terminal 10L in its lengthwise direction, the caved portion 15b being used as a support 15B for a curved member 15c. By bring the curved member 15c supported at the support 15B into contact with the base shell 2, the longer terminal 10L is connected with the base shell 2. Here, if the base shell 2 is formed of a conductive metal, it is preferable to attach an insulating member such as a resin to the outer side (base shell 2 side) of the curved member 15c. Alternately, it is also possible to attach the insulating member to the base shell 2.

In the above second and third preferred embodiments, since leading ends 10a of the longer terminals 10L are supported by the base shell 2, the same effects as obtained in the first one can be attained. Further, it is also preferable to provide a movement confining mechanism for confining a relative movement of the longer terminals 10L with respect to the base shell 2 in the second and the third preferred embodiments as well.

While the invention has been shown and described with respect to the preferred embodiments, it will be understood by those skilled in the art that various changes and modifications may be made without departing from the spirit and scope of the invention as defined in the following claims.

What is claimed is:

1. A memory card socket structure comprising:
   a base shell and a cover shell adapted to face a top and a bottom surface of a memory card;
   a contact block disposed in a rear side of a card compartment formed by the base shell and the cover shell; and
   a plurality of contact terminals fixed at the contact block and extended from the contact block toward an opening side of the card compartment to be in contact with terminals of the memory card,
   wherein the plurality of contact terminals include at least one shorter terminal and at least one longer terminal, the support position at which said at least one longer terminal is supported by the base shell being closer to the opening side of the card compartment than the support position at which said at least one shorter terminal is supported by the contact block, and
   wherein each of the longer terminals is provided with supports for supporting a leading end thereof against the base shell, and each of the supports has an exposed portion being provided on a side of the longer terminal, the side of the longer terminal facing the cover shell.

2. The socket structure of claim 1, wherein a part of the contact block is protruded toward the opening side of the card compartment along the base shell, and said at least one longer terminal is supported by the protruded portion of the contact block.

3. The socket structure of claim 1, further comprising a movement confining mechanism for confining a movement of the longer terminal relative to the base shell.

4. The socket structure of claim 1, wherein the base shell is formed of a conductive metal; an insulating member is interposed between the base shell and the longer terminal; and the longer terminal is supported by the base shell via the insulating member.

5. The socket structure of claim 4, wherein a part of the contact block is protruded toward the opening side of the card compartment along the base shell, and said at least one longer terminal is supported by the protruded portion of the contact block.

6. The socket structure of claim 4, further comprising a movement confining mechanism for confining a movement of the longer terminal relative to the base shell.

* * * * *